L. HOMRIGHOUSE.
Cultivator.
No. 102,543.
Patented May 3, 1871.
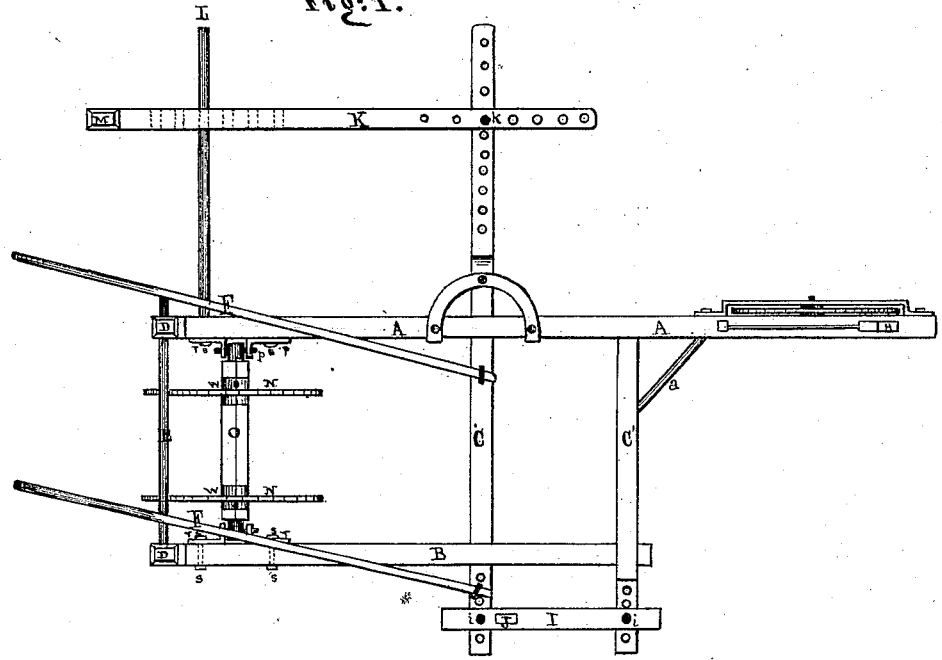
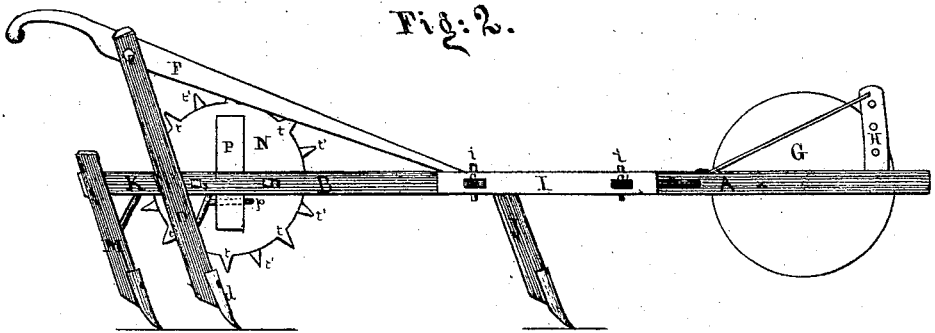

UNITED STATES PATENT OFFICE.

LOUIS HOMRIGHOUSE, OF BALTIMORE, OHIO.

IMPROVEMENT IN CULTIVATOR-PLOWS.

Specification forming part of Letters Patent No. 102,543, dated May 3, 1870.

*To all whom it may concern:*

Be it known that I, LOUIS HOMRIGHOUSE, M. D., of Baltimore, in the county of Fairfield and State of Ohio, have invented certain Improvements in Cultivator-Plows, of which the following is a specification.

My invention relates to the combination of double rotary fenders with a double cultivator-plow for plowing and cultivating both sides of a row of corn at one operation, so that the young plants shall be protected from the clods and earth thrown up from either side.

Figure 1 is a plan, and Fig. 2 a side elevation, of my improved double cultivator.

A is the main draft-beam of the implement; B, the main side beam; C C', cross-bars completing the frame and connecting the side beam, B, with the draft-beam A. $a$ is the brace to strengthen said frame. D D are shovel-bars secured to the rear ends of the draft and main side beams with the usual forward inclination, as illustrated in Fig. 2, and made to project above as well as below the draft-beams; $dd$, cultivator or plow shares or shovels, secured to the shovel-bars D D; E, a cross-bar connecting the upper ends of the two shovel-bars D D; F F, handles extending back from the cross-beam C, and secured by the cross-bar E. These handles are placed obliquely, as illustrated in Fig. 1, so that the plowman may walk upon one side of the row while holding them; G, a colter-wheel, and H a clevis-post, of usual form and construction.

Thus far my cultivator differs in no essential feature from the ordinary double cultivator-plows constructed for plowing both sides of a single row of corn at one operation, the horse and plowman walking on one side of the row.

In such cultivators, however, it often becomes difficult to hold the implement and steady it, because of the unequal and side strain thereon necessarily occasioned by the draft of the horse wholly on one side of the center. To diminish and overcome this difficulty I combine with the cultivator side shovels, one forward of the center on one side, the other to the rear thereof on the other, so arranged as that the or both may be used, and the distance of either from the center be altered and adjusted at pleasure.

In the accompanying drawings, I is the right-side beam, slotted at each end to receive the ends of the cross-beams C C', which are extended for the purpose. It is made to move thereon in or out, so that while it shall always be parallel to the main beams it may be removed therefrom or approached thereto at pleasure. It is secured at any desired point by pins $i\ i$. J is a shovel-bar and shovel secured and properly braced to the under side of this right-side beam I. (See Fig. 2.)

K is the left-side beam. Its front end is forked to embrace the projecting end of the cross-beam C, and its rear end is pierced with a series of holes, indicated by dotted lines in Fig. 1, and is steadied and secured by means of a bar, L, projecting horizontally from the rear end of the draft-beam A, parallel to the end of the cross-beam C, and passing through one of the holes in the side beam, K. The end of the cross-beam and the forked end of the side beam K are both pierced vertically with a series of holes, through which the pin $k$, securing the side beam to the cross beam, passes, and hence the side beam may be moved out laterally or be set farther forward or back by removing said pin $k$ and slipping the side beam laterally upon the bar for a lateral adjustment, or by passing said bar through another hole for an adjustment farther front or back.

M is a shovel-bar and shovel, secured and braced at the rear end of the side beam K, which is made to extend some distance back of the main shovels. Thus, in operation, one or both of the side shovels may be entirely removed for cross-plowing or crooked work, or they may be approximated to the main draft-beam or removed therefrom, as the necessities of the work may require in hard or light ground.

N N are rotary fenders secured to an axle, O, and placed thereon far enough apart to work on a row of corn. The ends of this axle O are secured in journal-boxes supported against the inner sides of the main plow-beams A B, between and slightly in front of the main shovels $d\ d$. The journal-boxes are placed in vertical ways P P, Fig. 2, so as to slide up and down therein, and are secured at any desired height by transverse pins $p$, Fig. 1. These vertical ways P P are formed with central horizontal cross-pieces, $rr$, Fig. 1, and are secured to the plow-beams by bolts $s\ s$, passing through extended horizontal slots in the cross-pieces, and which are tightened and secured by suitable nuts on their outer ends. These slots permit a lateral movement of the ways when the bolts are loosened, so as to bring the fenders N N to or from the shares d d, as required. The rotary fenders N N are provided with short spurs or teeth t t', Fig. 2, formed at intervals upon their circumference, to take hold of the ground and insure their rotation. The fenders are so secured upon their axle relatively one to the other as that the teeth t t on the one shall not be in the same right line with those, t' t', upon the other. Hence when the tooth t on one wheel is directly in the ground the corresponding tooth, t', on the other will not be so. The fender-wheels are also made with hubs w w, Fig. 2, fitting upon the axle O, and are secured to the axle by means of set-screws inserted through said hubs, so that they may be set wider apart or closer together upon their common axle at pleasure.

I do not claim as new the combination of a single adjustable rotary fender, as described in the Letters Patent issued to J. F. Cameron, January 15, 1861; nor the lateral adjustment of the main shovels of a cultivator, as set forth in the Letters Patent issued to J. M. Williams, June 26, 1860; but

I claim as my invention—

1. In combination with the frame A B C of a double-shovel cultivator constructed to cultivate simultaneously both sides of a row of corn, the two adjustable rotary fenders N N, so combined and arranged with reference to each other and to the main shovels b b as to inclose and shield both sides of the plant, substantially as herein set forth.

2. The extra and auxiliary detachable shovels J and M, when so combined with a cultivator as that one of said shovels, M, shall be placed to work in the rear and the other, J, in front of the main shovels b b of the implement, substantially as and for the purpose herein set forth.

The foregoing specification of my improvements in cultivator-plows signed by me this 30th day of December, 1869.

LOUIS HOMRIGHOUSE.

In presence of—
  A. T. MASON,
  S. D. KUMLER.